(12) United States Patent
Luong et al.

(10) Patent No.: US 12,118,064 B2
(45) Date of Patent: Oct. 15, 2024

(54) TRAINING MACHINE LEARNING MODELS USING UNSUPERVISED DATA AUGMENTATION

(71) Applicant: Google LLC, Mountain View, CA (US)

(72) Inventors: Thang Minh Luong, Mountain View, CA (US); Quoc V. Le, Sunnyvale, CA (US); Qizhe Xie, Pittsburgh, PA (US); Zihang Dai, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 537 days.

(21) Appl. No.: 17/606,190

(22) PCT Filed: Apr. 24, 2020

(86) PCT No.: PCT/US2020/029945
§ 371 (c)(1),
(2) Date: Oct. 25, 2021

(87) PCT Pub. No.: WO2020/219971
PCT Pub. Date: Oct. 29, 2020

(65) Prior Publication Data
US 2022/0215209 A1    Jul. 7, 2022

Related U.S. Application Data

(60) Provisional application No. 62/838,932, filed on Apr. 25, 2019.

(51) Int. Cl.
*G06F 18/21*    (2023.01)
*G06F 18/214*   (2023.01)
*G06N 3/08*     (2023.01)

(52) U.S. Cl.
CPC ........ *G06F 18/217* (2023.01); *G06F 18/2148* (2023.01); *G06N 3/08* (2013.01)

(58) Field of Classification Search
CPC .. G06F 18/217; G06F 18/2148; G06F 18/214; G06N 3/08; G06N 3/044;
(Continued)

(56) References Cited

U.S. PATENT DOCUMENTS 10,803,143 B2 * 10/2020 Kamen ................. G16H 50/30
2018/0285771 A1   10/2018 Lee et al.
(Continued)

FOREIGN PATENT DOCUMENTS

JP    2017-037588    2/2017
JP    2018-205920    12/2018
WO    WO 2017158058  9/2017

OTHER PUBLICATIONS

Bachman et al., "Learning with pseudo-ensembles," Advances in Neural Information Processing Systems, Dec. 2014, 9 pages.
(Continued)

*Primary Examiner* — Solomon G Bezuayehu
(74) *Attorney, Agent, or Firm* — Fish & Richardson P.C.

(57) ABSTRACT

Methods, systems, and apparatus, including computer programs encoded on computer storage media, for training a IT machine learning model. One of the methods includes receiving training data comprising a plurality of unlabeled training inputs and a plurality of labeled training inputs; generating augmented training data, comprising generating, for each of the plurality of unlabeled training inputs, a respective augmented training input by applying a data augmentation technique to the unlabeled training input; and training the machine learning model on the augmented training data. In particular, but not exclusively, the model may be trained for perceptual tasks (e.g. tasks relating to vision or speech).

20 Claims, 4 Drawing Sheets

(58) Field of Classification Search
CPC ........ G06N 3/045; G06N 3/047; G06N 3/088; G06N 20/00
See application file for complete search history.

(56) References Cited

U.S. PATENT DOCUMENTS

| | | | | |
|---|---|---|---|---|
| 2018/0348346 | A1* | 12/2018 | Vallespi-Gonzalez | ...................... G01S 7/4802 |
| 2019/0057320 | A1* | 2/2019 | Docherty | .............. G06F 18/217 |
| 2019/0179327 | A1* | 6/2019 | Martin | ................... G06V 20/58 |
| 2019/0188562 | A1* | 6/2019 | Edwards | ................ G06N 5/045 |
| 2019/0295223 | A1* | 9/2019 | Shen | ......................... G06T 5/60 |
| 2019/0310651 | A1* | 10/2019 | Vallespi-Gonzalez | ...................... G01S 17/58 |
| 2019/0354839 | A1* | 11/2019 | Meshi | .................... G06N 3/044 |
| 2020/0034707 | A1* | 1/2020 | Kivatinos | .............. G06Q 30/04 |
| 2020/0202210 | A1* | 6/2020 | Kushnir | ................... G06N 3/08 |
| 2020/0242353 | A1* | 7/2020 | Zhang | .................... G06V 10/82 |
| 2020/0293729 | A1* | 9/2020 | Arslan | ................... G06N 3/044 |

OTHER PUBLICATIONS

Chapelle et al., "Semi-supervised learning (Chapelle, O. et al., Eds.; 2006) [Book reviews]," IEEE Transactions on Neural Networks, Mar. 2009, 20(3):542-542.
Cheng et al., "Semi-supervised learning for neural machine translation," arXiv, Dec. 10, 2016, 10 pages.
Chollet, "Xception: Deep learning with depthwise separable convolutions," Proceedings of the IEEE conference on computer vision and pattern recognition, Jul. 2017, pp. 1251-1258.
Clark et al., "Semi-supervised sequence modeling with cross-view training," arXiv, Sep. 22, 2018.
Collobert et al., "A unified architecture for natural language processing: Deep neural networks with multitask learning," Proceedings of the 25th international conference on machine learning, Jul. 5, 2008, pp. 160-167.
Cubuk et al., "Autoaugment: Learning augmentation policies from data," arXiv, Oct. 9, 2018, 14 pages.
Cubuk et al., "Randaugment: Practical data augmentation with no separate search," arXiv, Sep. 30, 2019, 12 pages.
Dai et al., "Good semi-supervised learning that requires a bad GAN," Advances in Neural Information Processing Systems, Dec. 2017, 11 pages.
Dai et al., "Semi-supervised sequence learning," Advances in neural information processing systems, Dec. 2015, 9 pages.
Deng et al., "Imagenet: A large-scale hierarchical image database," Presented at IEEE conference on computer vision and pattern recognition, Miami, FL, USA, Jun. 20-25, 2009, pp. 248-255.
Devlin et al., "Bert: Pre-training of deep bidirectional transformers for language understanding," arXiv, Oct. 11, 2018, 14 pages.
Edunov et al., "Understanding back-translation at scale," arXiv, Oct. 3, 2018, 12 pages.
Hannun et al., "Deep speech: Scaling up end-to-end speech recognition," arXiv, Dec. 19, 2014, 12 pages.
He et al., "Deep residual learning for image recognition," Proceedings of the IEEE conference on computer vision and pattern recognition, Jun. 2016, pp. 770-778.
He et al., "Dual learning for machine translation," Advances in Neural Information Processing Systems, Dec. 2016, 9 pages.
Hinton et al., "Distilling the knowledge in a neural network," arXiv, Mar. 9, 2015, 9 pages.
Howard et al., "Universal language model fine-tuning for text classification," Proceedings of the 56th Annual Meeting of the Association for Computational Linguistics, Jul. 2018, 1:328-339.
International Preliminary Report on Patentability in International Appln. No. PCT/US2020/029945, dated Nov. 4, 2021, 10 pages.
International Search Report and Written Opinion in International Appln. No. PCT/US2020/029945, dated Oct. 2, 2020, 12 pages.
Kingma et al., "Semi-supervised learning with deep generative models," Advances in neural information processing systems, Dec. 2014, 9 pages.
Kipf et al., "Semi-supervised classification with graph convolutional networks," arXiv, Nov. 3, 2016, 13 pages.
Krizhevsky et al., "Imagenet classification with deep convolutional neural networks," Advances in neural information processing systems, Dec. 2012, 9 pages.
Krizhevsky, "Learning multiple layers of features from tiny images," Apr. 8, 2009, 60 pages.
Laine et al., "Temporal ensembling for semi-supervised learning," arXiv, Nov. 7, 2016, 9 pages.
Lee, "Pseudo-label: The simple and efficient semi-supervised learning method for deep neural networks," Presented at ICML 2013 Workshop: Challenges in Representation Learning (WREPL), Atlanta, Georgia, USA, Jun. 16-21, 2013, 6 pages.
Maaloe et al., "Auxiliary deep generative models," arXiv, Jun. 16, 2016, 9 pages.
Maas et al., "Learning word vectors for sentiment analysis," Presented at 49th Annual Meeting of the Association for Computational Linguistics: Human language technologies, Portland, Oregon, USA, Jun. 19-24, 2011, 1:142-150.
Martins et al., "Clustering using neural networks and Kullback-Leibler divergency," Presented at IEEE International Joint Conference on Neural Networks, Budapest, Hungary, Jul. 25, 2004, 4:2813-2817.
McAuley et al., "Image-based recommendations on styles and substitutes," Proceedings of the 38th International ACM SIGIR Conference on Research and Development in Information Retrieval, Aug. 2015, pp. 43-52.
Mikolov et al., "Distributed Representations of Words and Phrases and their Compositionality," Advances in neural information processing systems, Dec. 2013, 9 pages.
Miyato et al., "Adversarial Training Methods for Semi-Supervised Text Classification," arXiv, Nov. 7, 2016, 10 pages.
Miyato et al., "Virtual Adversarial Training: A Regularization Method for Supervised and Semi-Supervised Learning," IEEE transactions on pattern analysis and machine intelligence, Jul. 23, 2018, 14 pages.
Netzer et al., "Reading digits in natural images with unsupervised feature learning," Jan. 2011, 9 pages.
Oliver et al., "Realistic evaluation of deep semi-supervised learning algorithms," Advances in Neural Information Processing Systems, Feb. 2018, 12 pages.
Park et al., "Specaugment: A simple data augmentation method for automatic speech recognition," arXiv, Dec. 3, 2019, 6 pages.
Pennington et al., "Glove: Global vectors for word representation," Proceedings of the 2014 Conference on Empirical Methods in Natural Language Processing (EMNLP), Oct. 2014, pp. 1532-1543.
Peters et al., "Deep contextualized word representations," arXiv, Mar. 22, 2018, 15 pages.
Radford et al., "Improving language understanding by generative pre-training," 2018, 12 pages.
Salimans et al., "Improved techniques for training GANs," Advances in neural information processing systems, Dec. 2016, 9 pages.
Sennrich et al., "Improving neural machine translation models with monolingual data," arXiv, Nov. 20, 2015, 10 pages.
Simard et al., "Transformation Invariance in Pattern Recognition—Tangent Distance and Tangent Propagation," Neural networks: tricks of the trade, Jan. 1998, 35 pages.
Tarvainen et al., "Mean teachers are better role models: Weight-averaged consistency targets improve semi-supervised deep learning results," Advances in neural information processing systems, 2017, 10 pages.
Vaswani et al., "Attention is all you need," Advances in neural information processing systems, Dec. 2017, 11 pages.
Weston et al., "Deep learning via semi-supervised embedding," Neural Networks: Tricks of the Trade, 2012, pp. 639-655.
Yang et al., "Revisiting semi-supervised learning with graph embeddings," arXiv, May 26, 2016, 9 pages.
Yang et al., "Semi-supervised QA with generative domain-adaptive nets," arXiv, Apr. 22, 2017, 11 pages.

(56) References Cited

OTHER PUBLICATIONS

Yu et al., "QANet: Combining local convolution with global self-attention for reading comprehension," arXiv, Apr. 23, 2018, 16 pages.

Zagoruyko et al., "Wide residual networks," arXiv, Nov. 28, 2016, 15 pages.

Zhang et al., "Character-level convolutional networks for text classification," Advances in neural information processing systems, Dec. 2015, 9 pages.

Zhang et al., "mixup: Beyond Empirical Risk Minimization," arXiv, Oct. 25, 2017, 11 pages.

Zhu et al., "Semi-supervised learning using Gaussian fields and harmonic functions," Proceedings of the 20th International Conference on Machine Learning, Aug. 21, 2003, 8 pages.

Notice of Allowance in Japanese Appln. No. 2021-563340, mailed on Apr. 1, 2024, 5 pages (with English translation).

Sajjadi et al., "Regularization with stochastic transformations and perturbations for deep semi-supervised learning." Advances in neural information processing systems 29, 2016, 9 pages.

\* cited by examiner

(a) CIFAR-10

(b) SVHN

FIG. 4

TRAINING MACHINE LEARNING MODELS USING UNSUPERVISED DATA AUGMENTATION

CROSS-REFERENCE TO RELATED APPLICATION

This application is a national phase entry under 35 U.S.C. 371 of PCT Application Serial No. PCT/US2020/029945, filed April 24, 2020, which claims priority to U.S. Patent Application No. 62/838,932, filed on April 24, 2019. The entirety of each of the foregoing is incorporated by reference.

BACKGROUND

This specification relates to training machine learning models. In particular, but not exclusively, it relates to training machine learning models for perceptual tasks (e.g. tasks relating to vision or speech).

Machine learning models receive an input and generate an output, e.g., a predicted output, based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that trains a machine learning model to perform a machine learning task through semi-supervised learning, i.e., by training the machine learning model on training data that includes unlabeled training inputs and labeled training inputs. A labeled training input is an input for which a ground truth output, i.e., the output that should be generated by the machine learning model by performing the particular machine learning task on the labeled training input, is available. An unlabeled training input is a training input for which the ground truth output is not available.

The system trains the machine learning model by generating augmented training data from the training data and then training the machine learning on the augmented training data. Generating the augmented training data includes generating, for each of the plurality of unlabeled training inputs, a respective augmented training input by applying a data augmentation technique to the unlabeled training input.

Particular embodiments of the subject matter described in this specification can be implemented so as to realize one or more of the following advantages. By training a machine learning model as described in this specification, the machine learning model can be trained to generate accurate model outputs. In particular, by training the machine learning model as described in this specification, unlabeled training data can be effectively incorporated into the training, improving the performance of the machine learning model. That is, the performance of the trained model can be improved without requiring additional labeled training data. Because unlabeled training data is generally more readily available than labeled training data, the effectiveness of the training can be improved without greatly increasing the time and computational cost of obtaining or generating additional training data. More specifically, augmentation techniques, e.g., techniques that have conventionally been applied to labeled training data, can be effectively applied to unlabeled data to improve the training of the machine learning model without requiring additional training data, either labeled or unlabeled. Additionally, the machine learning model can be effectively trained even if only a relatively small amount of labeled training data is available by effectively incorporating readily available unlabeled training data into the training as described in this specification. Thus, the training of the model to generate accurate model outputs becomes less dependent on the availability of accurately labeled training data. As a result, the model may be trained in an effective way and with far fewer labeled examples compared with models trained on a complete supervised set.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
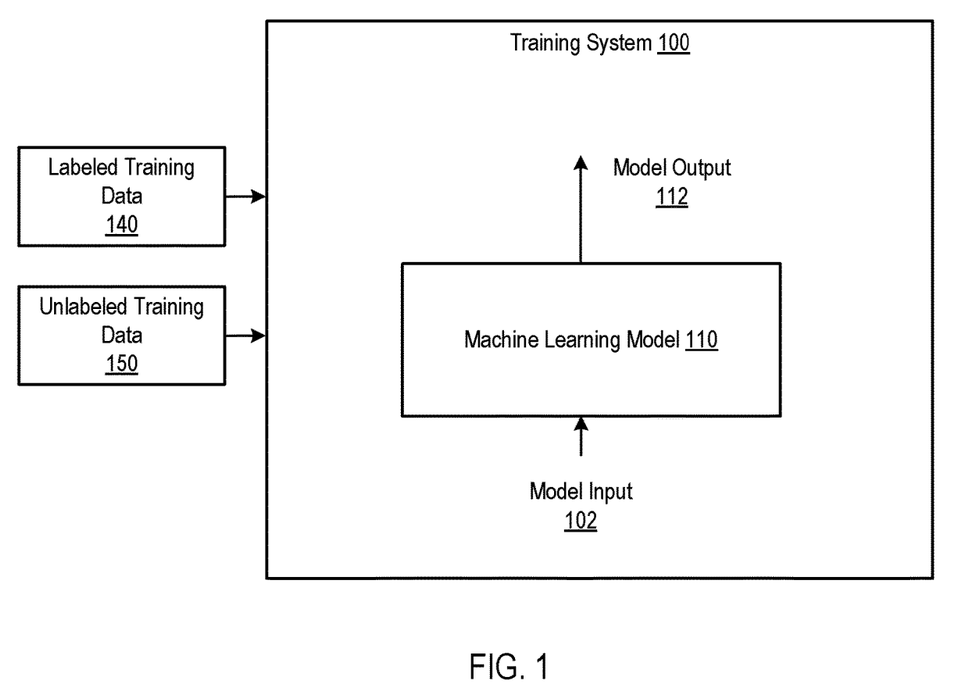
FIG. 1 shows an example machine learning model training system.

FIG. 1 shows an example machine learning model training system 100. The machine learning model training system 100 is an example of a system implemented as computer programs on one or more computers in one or more locations, in which the systems, components, and techniques described below can be implemented.

The machine learning model training system 100 is a system that trains a machine learning model 110 on training data that includes labeled training data 140 and unlabeled training data 150 to determine trained values of the parameters of the machine learning model 110, referred to in this specification as model parameters, from initial values of the model parameters.

The machine learning model 110 is a machine learning model that is configured to receive a model input 102 and to process the model input to map the model input 102 to a model output 112 to perform a particular machine learning task in accordance with the model parameters.

The machine learning model 110 can be configured to perform any of a variety of machine learning tasks, i.e., to receive as input any kind of digital data input and to generate a model output from the input. Generally, the model output is a probability distribution over a set of possible classes.

For example, if the task is a computer vision task, e.g., image classification, the inputs to the model 110 are images and the model output for a given image may be probabilities for each of a set of object categories, with each probability representing an estimated likelihood that the image contains an image of an object belonging to the category.

As another example, if the machine learning task is document classification, the inputs to the machine learning model 110 are text from Internet resources (e.g., web pages) or documents and the model output for a given Internet resource, document, or portion of a document may be a score for each of a set of topics, with each score representing an estimated likelihood that the Internet resource, document, or document portion is about the topic.

As another example, if the task is a natural language understanding task, the inputs to the machine learning model 110 are sequences of text and the model output for a given sequence of text can be a probability distributions that is appropriate for the natural language understanding task, e.g., a distribution over language acceptability categories, language sentiment categories, language paraphrasing categories, sentence similarity categories, textual entailment categories, question answering categories, and so on.

As another example, if the task is a health prediction task, the inputs to the machine learning model 110 are electronic health record data for a patient, and the model output for a given sequence can be a probability distribution over patient health-related categories, e.g., possible diagnoses for the patient, possible future health events associated with the patient, and so on.

As another example, if the task is a speech processing task, the inputs to the machine learning model 110 can be audio data representing a spoken utterance, e.g., raw audio or acoustic features, and the model output can be a probability distribution over a set of speech classification categories, e.g., a probability distribution over possible languages, a probability distribution over a set of possible hotwords, and so on.

The machine learning model 110 can have any architecture that is appropriate for the type of model inputs processed by the machine learning model 110. For example, when the model inputs are images, the machine learning model 110 can be a convolutional neural network. When the model inputs are text sequences or sequences of other features, e.g., electronic health record features, the machine learning model 110 can be a self-attention based neural network, e.g., a Transformer, or a recurrent neural network, e.g., a long short-term memory (LSTM) neural network. When the model inputs include inputs of multiple modalities, e.g., both images and text, the model 110 can include different types of neural networks, e.g., both convolutional layers and self-attention or recurrent layers.

The labeled training data 140 that is used by the system 100 to train the machine learning model 110 includes multiple batches of labeled training inputs. The training inputs are referred to as "labeled" training inputs because the labeled training data 140 also includes, for each labeled training input, a ground truth output, i.e., an output that should be generated by the machine learning model by performing the particular machine learning task on the labeled training input. In other words, the ground truth output is the actual output of the machine learning task when performed on the corresponding labeled training input.

The unlabeled training data 150 that is used by the system 100 to train the machine learning model 110 includes multiple batches of unlabeled training inputs. The training inputs are referred to as "unlabeled" training inputs because ground truth outputs for the unlabeled training inputs are unavailable, i.e., the system 100 does not have access to any ground truth outputs for any of the unlabeled training inputs or for some other reason cannot use ground truth outputs for any of the unlabeled training inputs for the training of the model 110.

Generally, the batches of unlabeled training inputs may include the same number of training inputs as the batches of labeled training inputs or a different number of training inputs from the batches of labeled training inputs. For example, in the common case where there are many more unlabeled training items available than labeled training items, the batches of unlabeled training items may include more training items than the batches of labeled training items.

Generally, the system 100 trains the machine learning model 110 by generating augmented training data from the training data and then training the machine learning model 110 on the augmented training data. To generate the augmented training data, the system 100 generates, for each of the plurality of unlabeled training inputs, a respective augmented training input by applying a data augmentation technique to the unlabeled training input Generating the augmented training data and training the machine learning model 110 on the augmented training data is described in more detail below with reference to FIGS. 2 and 3.

Once the model 110 has been trained, the system 100 can provide data specifying the trained model for use in processing new network inputs. That is, the system 100 can output, e.g., by outputting to a user device or by storing in a memory accessible to the system 100, the trained values of the model parameters for later use in processing inputs using the trained model.

Alternatively or in addition to outputting the trained machine learning model data, the system 100 can instantiate an instance of the machine learning model having the trained values of the model parameters, receive inputs to be processed, e.g., through an application programming interface (API) offered by the system, use the trained model to process the received inputs to generate model outputs and then provide the generated model outputs, classification outputs, or both in response to the received inputs.

Figure 2:
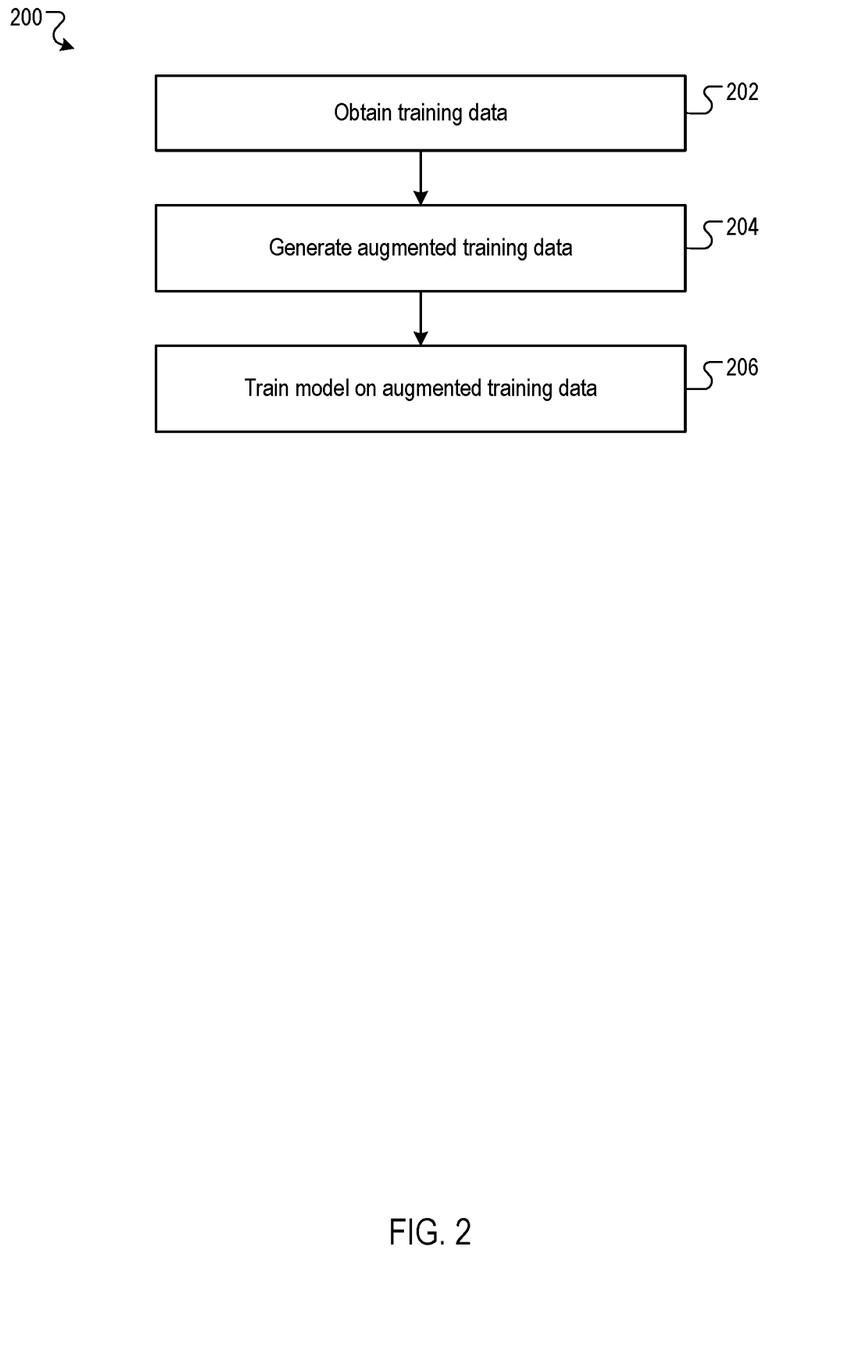
FIG. 2 is a flow diagram of an example process for training a machine learning model.

FIG. 2 is a flow diagram of an example process 200 for training a machine learning model on a training data that includes unlabeled training inputs and labeled training inputs. For convenience, the process 200 will be described as being performed by a system of one or more computers located in one or more locations. For example, a machine learning model training system, e.g., the machine learning model training system 100 of FIG. 1, appropriately programmed, can perform the process 200.

The system receives training data for training a machine learning model to map model inputs to model outputs in order to perform a particular machine learning task (step 202). As described above, the training data includes both unlabeled training inputs and labeled training inputs. For each labeled training input, the training data also includes a ground truth output that should be generated by the machine learning model by performing the particular machine learning task on the labeled training input.

The system generates augmented training data from the training data (step 204). In particular, the system generates, for each of the plurality of unlabeled training inputs, a respective augmented unlabeled training input by applying a data augmentation technique to the unlabeled training input.

The data augmentation technique that is employed is dependent on what types of inputs the machine learning model operates on.

For example, when the model inputs are images, the data augmentation technique can be a learned, data-dependent technique, e.g., a technique learned using an AutoAugment approach. In other words, the system can use the data-dependent AutoAugment technique to search over the labeled inputs for a learned combination of image processing transformation from a set of image processing transformations to be used as the augmentation technique for the unlabeled inputs. AutoAugment is described in more detail in Ekin D Cubuk, Barret Zoph, Dandelion Mane, Vijay Vasudevan, and Quoc V Le. Autoaugment: Learning augmentation policies from data. arXiv preprint arXiv: 1805.09501, 2018.

As another example, when the model inputs are images, the data augmentation technique can be a technique that is determined through a hyperparameter search, i.e., before the training of the model. For example, the data augmentation technique may be a RandAugment technique that applies a grid search or other hyperparameter optimization technique to identify values of hyperparameters that define the augmentation policy: e.g., hyparameters which define the number of transformations that are applied to each image and define the magnitude of each applied transformation. RandAugment is described in more detail in Ekin D Cubuk, Barret Zoph, Jonathon Shlens, and Quoc V Le. Randaugment: Practical data augmentation with no separate search. arXiv preprint, 2019.

As another example, when the model inputs are natural language text, the data augmentation technique can be a back translation technique. Back translation refers to the procedure of translating an existing example in language A into another language B and then translating it back into A to obtain an augmented example. For example, the system can randomly select one or more words in the model input and back translate the randomly selected words to generate the augmented unlabeled input.

As yet another example, when the model inputs are natural language text, the data augmentation technique can be a TF-IDF based word replacing technique. A TF-IDF based word replacing technique is one that replaces uninformative words with low TF-IDF scores while keeping those with high TF-IDF values. For example, the system can assign a probability to each word in the input that is based on the TF-DF value of the word, with words with higher TF-IDF values having higher probabilities. The system can then sample a set number of words in accordance with the assigned probabilities, and replace each sampled word with, e.g., a word that is sampled from the possible vocabulary of input words.

Thus, the augmented training data includes (i) labeled training inputs, (ii) unlabeled training inputs, and (iii) augmented unlabeled training inputs, with each unlabeled training input corresponding to one of the unlabeled training inputs.

While (i) and (ii) will be described in this specification as training inputs that have not been augmented, in some cases the system can apply simple augmentations, e.g., cropping and flipping when the inputs are images, to the training examples in (i) and (ii) to improve the robustness of the training process. These simple augmentations are generally different than the augmentation policy used to generate (iii) from (ii), i.e., the augmentation policy is generally much more complex than the simple augmentations. In other words, in some cases, the labeled and unlabeled training inputs in the augmented training data have had simple augmentations applied using a different augmentation policy.

The system then trains the machine learning model on the augmented training data (step 206). In particular, the system trains the model to optimize an objective, e.g., minimize a loss, that is a combination, e.g., a sum, an average, or a weighted sum, of an unsupervised objective and a supervised objective.

The unsupervised objective measures, for a given unlabeled training input the difference between (i) a model output generated by the machine learning model for the given unlabeled training input and (ii) a model output generated by the machine learning model for the corresponding augmented unsupervised training input, i.e., the augmented training input that was generated from the unlabeled training input.

As a particular example, the unsupervised objective can be based on a Kullback-Leibler (K-L) divergence between (i) the model output generated by the machine learning model for the given unlabeled training input and (ii) the model output generated by the machine learning model for the corresponding augmented unsupervised training input. In this example, the unsupervised objective can satisfy:

$$\lambda E_{x \in U} E_{\hat{x} \sim q(\hat{x}|x)}[D_{KL}(p_{\tilde{\theta}}(y|x) \| p_{\theta}(y|\hat{x})))],$$

where $\lambda$ is a positive constant value, e.g., 1.5, 1, or 0.5, E is the expectation operator, x is an unlabeled training input from the unlabeled training data U, z is the corresponding augmented unlabeled training input generated from x by applying the augmentation policy q, $D_{KL}(p_{\tilde{\theta}}(y|x) \| p_{\theta}(y|\hat{x})))$ is the K-L divergence between (i) the model output generated by the machine learning model p for the unlabeled training input x and (ii) the model output generated by the machine learning model for the augmented training input $\hat{x}$, $\theta$ denotes the model parameters, and $\tilde{\theta}$ denotes a fixed copy of the current model parameters $\theta$, indicating that the gradient is not propagated through $\tilde{\theta}$ when computing model parameter updates.

The supervised objective measures, for a given labeled training input, the difference between (i) a model output generated by the machine learning model for the given labeled training input and (ii) the ground truth output for the given labeled training input. As a particular example, the supervised objective can be based on a negative log likelihood of the given ground truth output according to the probability distribution generated for the given labeled training input. In other words, the supervised objective can satisfy:

$$E_{x,y^* \in L}[-\log(p_{\theta}(y^*|x)],$$

where x is a labeled training input from the labeled training data L and y* is the ground truth output for x.

In some implementations, there may be a large difference between the amount of unlabeled data and the amount of labeled data that are available for training the machine learning model, i.e., there may be a much larger amount of unlabeled data than labeled data in the available training data. This can result in the model quickly overfitting to the limited amount of labeled data while still underfitting the unlabeled data. To mitigate this difficulty, in some implementations, the system uses a technique which gradually releases the "training signals" of the labeled examples as training progresses.

At a high level, with this technique, the system only utilizes a labeled example if the model's confidence on that example is lower than a predefined threshold which increases according to a schedule during the training.

More specifically, instead of using a negative log likelihood as the supervised objective as described above, the system uses a modified supervised objective.

Like the objective described above, the modified supervised objective is based on a negative log likelihood of the given ground truth output according to the probability distribution generated for the given labeled training input, but only when the probability assigned to the given ground truth output by the probability distribution is less than a confidence threshold.

When the probability assigned to the given ground truth output by the probability distribution is equal to or greater than the confidence threshold, the system removes the given training input from the loss function. This removal can be accomplished by setting the supervised objective equal to zero when the probability assigned to the given ground truth output by the probability distribution is equal to or greater than the confidence threshold.

Figure 3:
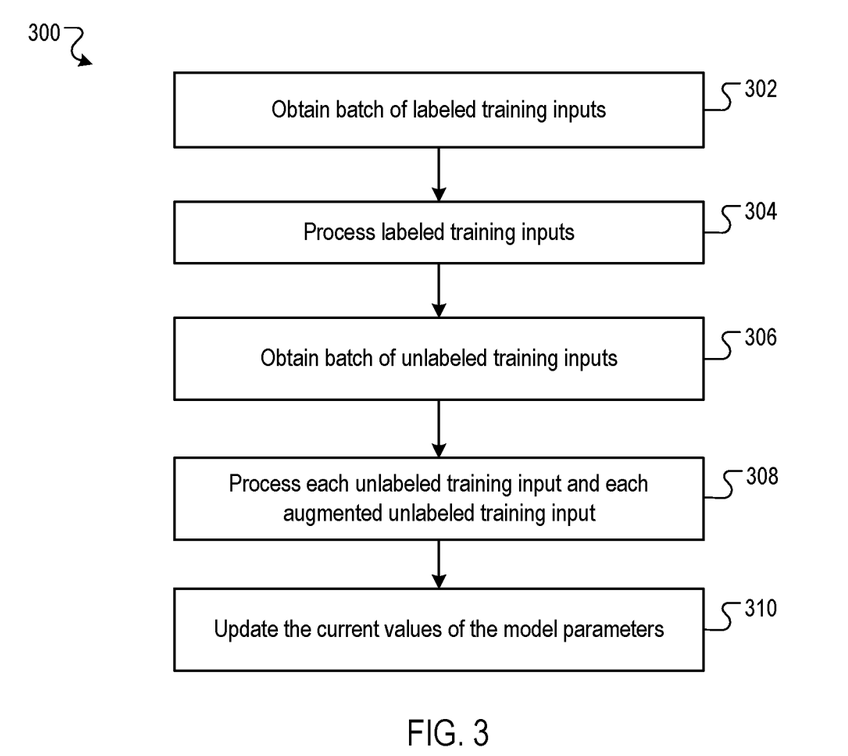
FIG. 3 is a flow diagram of an example process for training a machine learning model on a batch of unlabeled training inputs and a batch of labeled training inputs.

Generally, the system increases this confidence threshold as training progresses. For example, if the number of categories over which the probability distribution is generated is equal to K, the system can gradually increase the confidence threshold from 1/K to 1 as training progresses. As a particular example, the system can increase the confidence threshold after each training step, i.e., after each iteration of the process 300 described below that is performed.

The system can increase the confidence threshold according to any of a variety of schedules.

For example, the system can increase the schedule according to a logarithmic schedule. In this example, the value of the threshold at a training step t satisfies:

$$\alpha_t * \left(1 - \frac{1}{K}\right) + \frac{1}{K}, \text{ where } \alpha_t = 1 - \exp\left(-\frac{t}{T} * 5\right)$$

and T is the total number of training steps.

As another example, the system can increase the schedule according to a linear schedule. In this example, $$\alpha_t = \frac{t}{T}.$$

As another example, the system can increase the schedule according to an exponential schedule. In this example $$\alpha_t = \exp\left(\left(\frac{t}{T} - 1\right) * 5\right).$$

Intuitively, when the model is prone to overfit, e.g., when the task is relatively easy or the number of labeled examples is very limited, the exponential schedule is most suitable as the supervised signal is mostly released at the end of training. In contrast, when the model is less likely to overfit (e.g., when there are abundant labeled examples or when the model employs effective regularization), the logarithmic schedule may be used.

In particular, during the training, the system trains the machine learning model by performing multiple iterations of a machine learning training procedure, with each iteration of the procedure being performed on both a batch of labeled training inputs and a batch of unlabeled training inputs. During each iteration, the system determines, based on the supervised objective and the unsupervised objective, an update to current values of the model parameters as of the iteration and applies the update to the current values to generate updated values of the model parameters.

FIG. 3 is a flow diagram of an example process 300 for training a machine learning model on a batch of unlabeled training inputs and a batch of labeled training inputs. For convenience, the process 300 will be described as being performed by a system of one or more computers located in one or more locations. For example, a machine learning model training system, e.g., the machine learning model training system 100 of FIG. 1, appropriately programmed, can perform the process 300.

The system can perform the process 300 multiple times for multiple different labeled batch—unlabeled batch combinations to determine trained values of the model parameters from initial values of the model parameters. For example, the system can continue performing the process 300 for a specified number of iterations, for a specified amount of time, or until the change in the values of the parameters falls below a threshold.

The system obtains a batch of labeled training inputs (step 302).

The system processes each labeled training input using the machine learning model and in accordance with current values of the model parameters to generate a respective model output for each of the labeled training inputs (step 304).

The system obtains an unlabeled batch of unlabeled training inputs and an augmented unlabeled training input for each unlabeled training input in the unlabeled batch (step 306).

The system processes each unlabeled training input and each augmented unlabeled training input using the machine learning model and in accordance with current values of the model parameters to generate a respective model output for each of the unlabeled training inputs (step 308).

The system updates, based on the model outputs for the labeled training inputs, the unlabeled training inputs, and unlabeled training inputs, the current values of model parameters (step 310).

In particular, the system determines respective gradients with respect to the model parameters of the supervised objective for each of the labeled training inputs and respective gradients with respect to the model parameters of the unsupervised objective for each of the unlabeled training inputs.

The system then combines the respective gradients, e.g., by averaging or adding the respective gradients, to generate a combined gradient and then updates the current values of the model parameters using the combined gradient, e.g., by applying an update rule, e.g., a learning rate, an Adam optimizer update rule, or an rmsProp update rule, to the combined gradient to generate an update and then applying, i.e., subtracting or adding, the update to the current values.

Figure 4:
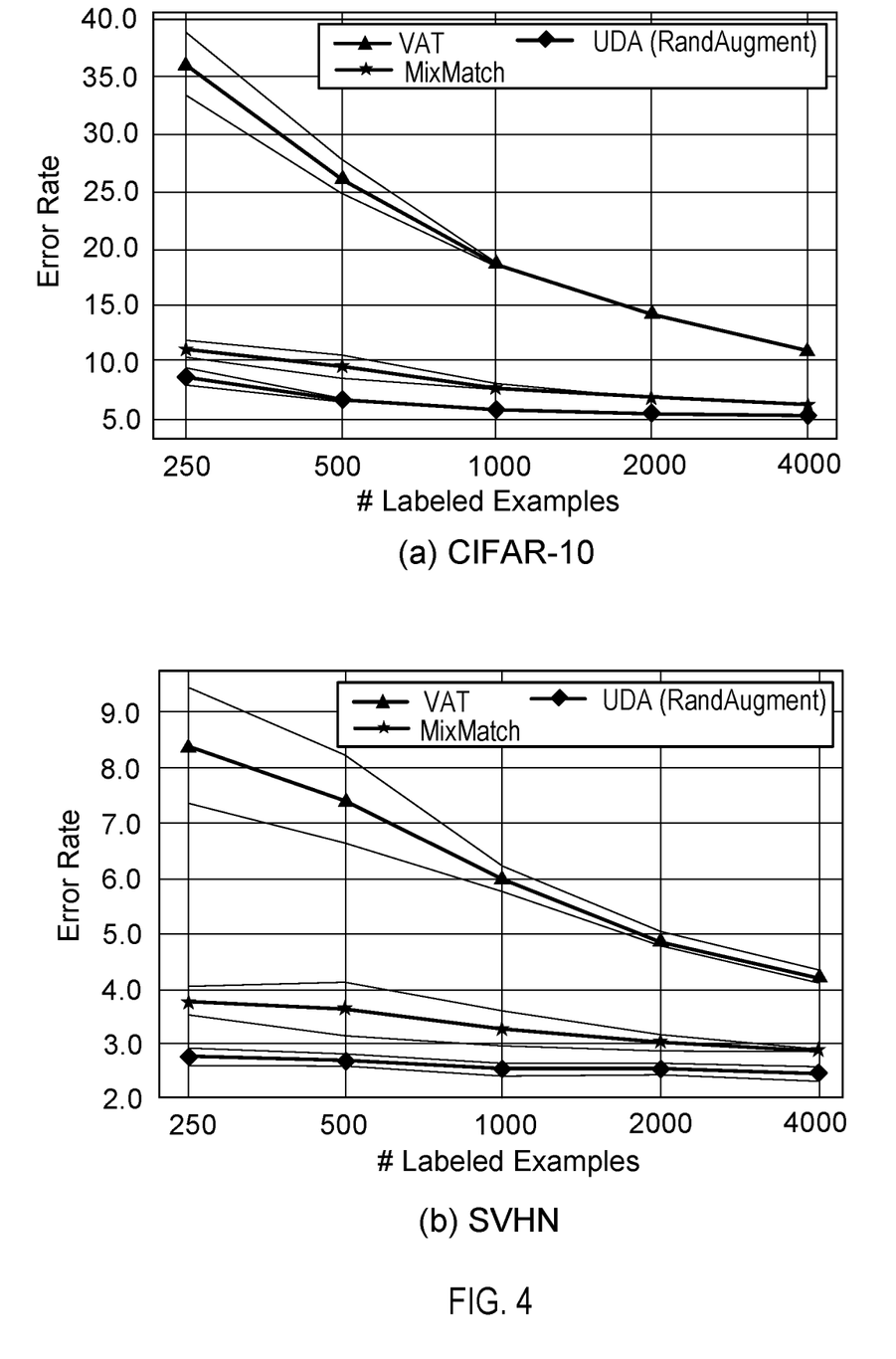
FIG. 4 shows the performance of the described techniques relative to other semi-supervised learning techniques.

FIG. 4 shows the performance of the described techniques relative to other semi-supervised learning techniques.

In particular, FIG. 4 shows a comparison of the described techniques ("UDA" with a "RandAugment" augmentation policy) with two highly competitive baselines: (1) Virtual adversarial training (VAT) (Miyato et al., 2018), an algorithm that generates adversarial Gaussian noise on input, and (2) MixMatch, a technique that combines previous advancements in semi-supervised learning ((Berthelot et al., 2019)).

As can be seen from FIG. 4, the error rates of a trained model trained using the described techniques are consistently lower, i.e., better than the two baselines at different sizes of labeled data, i.e., the described technique consistently outperforms the two baselines with a clear margin given different sizes of labeled data.

Thus, even compared to other semi-supervised learning techniques, i.e., other techniques that use both labeled and unlabeled data, the described techniques result in more effective model training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving training data for training a machine learning model to map model inputs to model outputs in order to perform a particular machine learning task, the training data comprising:
   a plurality of unlabeled training inputs; and
   a plurality of labeled training inputs and, for each labeled training input, a ground truth output that should be generated by the machine learning model by performing the particular machine learning task on the labeled training input;
   generating augmented training data, comprising generating, for each of the plurality of unlabeled training inputs, a respective augmented training input by applying a data augmentation technique to the unlabeled training input;
   training the machine learning model on the augmented training data, comprising:
   training the machine learning model on the unlabeled training inputs and the augmented training inputs to optimize an unsupervised objective that measures a difference between (i) a model output generated by the machine learning model for a given unlabeled training input and (ii) a model output generated by the machine learning model for the augmented training input generated from the unlabeled training input, and
   training the machine learning model on the labeled training inputs to optimize a supervised objective that measures a difference between (i) a model output generated by the machine learning model for a given labeled training input and (ii) the ground truth output for the given labeled training input.

2. The method of claim 1, wherein the model outputs are probability distributions and wherein the unsupervised objective is based on a K-L divergence between (i) the model output generated by the machine learning model for the given unlabeled training input and (ii) the model output generated by the machine learning model for the augmented training input generated from the unlabeled training input.

3. The method of claim 1, wherein the model outputs are probability distributions and wherein the supervised objective is based on a negative log likelihood of the given ground truth output according to the probability distribution generated for the given labeled training input.

4. The method of claim 1, wherein the labeled and unlabeled training inputs in the augmented training data have been augmented by applying a different data augmentation technique from the data augmentation technique used to generate the augmented unlabeled training inputs.

5. The method of claim 1, wherein the model outputs are probability distributions, wherein the supervised objective is:
based on a negative log likelihood of the given ground truth output according to the probability distribution generated for the given labeled training input when the probability assigned to the given ground truth output by the probability distribution is less than a confidence threshold, and
equal to zero when the probability assigned to the given ground truth output by the probability distribution is equal to or greater than the confidence threshold.

6. The method of claim 5, wherein the training comprises: increasing the confidence threshold as training progresses.

7. The method of claim 6, wherein increasing the confidence threshold comprises increasing the confidence threshold after each training step.

8. The method of claim 1, wherein the machine learning model is trained to map model inputs comprising visual data to model outputs, thereby to perform a computer vision task.

9. The method of claim 1, wherein the machine learning task is image classification, the model inputs are images and the model outputs for a given image are probabilities for each of a set of object categories, each probability representing an estimated likelihood that the image contains an object belonging to the category.

10. The method of claim 1, wherein the machine learning model is trained to map inputs comprising audio data representing a spoken utterance to an output in order to perform a speech classification task.

11. The method of claim 1, wherein a model input comprises electronic health record data for a patient and the corresponding model output comprises a probability distribution over possible diagnoses for the patient.

12. One or more non-transitory computer-readable storage media storing instructions that when executed by one or more computers cause the one more computers to perform -operations comprising:
receiving training data for training a machine learning model to map model inputs to model outputs in order to perform a particular machine learning task, the training data comprising:
a plurality of unlabeled training inputs; and
a plurality of labeled training inputs and, for each labeled training input, a ground truth output that should be generated by the machine learning model by performing the particular machine learning task on the labeled training input;
generating augmented training data, comprising generating, for each of the plurality of unlabeled training inputs, a respective augmented training input by applying a data augmentation technique to the unlabeled training input;
training the machine learning model on the augmented training data, comprising:
training the machine learning model on the unlabeled training inputs and the augmented training inputs to optimize an unsupervised objective that measures a difference between (i) a model output generated by the machine learning model for a given unlabeled training input and (ii) a model output generated by the machine learning model for the augmented training input generated from the unlabeled training input, and
training the machine learning model on the labeled training inputs to optimize a supervised objective that measures a difference between (i) a model output generated by the machine learning model for a given labeled training input and (ii) the ground truth output for the given labeled training input.

13. A system comprising one or more computers and one or more storage devices storing instructions that when executed by the one or more computers cause the one more computers to perform operations comprising:
receiving training data for training a machine learning model to map model inputs to model outputs in order to perform a particular machine learning task, the training data comprising:
a plurality of unlabeled training inputs; and
a plurality of labeled training inputs and, for each labeled training input, a ground truth output that should be generated by the machine learning model by performing the particular machine learning task on the labeled training input;
generating augmented training data, comprising generating, for each of the plurality of unlabeled training inputs, a respective augmented training input by applying a data augmentation technique to the unlabeled training input;
training the machine learning model on the augmented training data, comprising:
training the machine learning model on the unlabeled training inputs and the augmented training inputs to optimize an unsupervised objective that measures a difference between (i) a model output generated by the machine learning model for a given unlabeled training input and (ii) a model output generated by the machine learning model for the augmented training input generated from the unlabeled training input, and training the machine learning model on the labeled training inputs to optimize a supervised objective that measures a difference between (i) a model output generated by the machine learning model for a given labeled training input and (ii) the ground truth output for the given labeled training input.

14. The system of claim 13, wherein the model outputs are probability distributions and wherein the unsupervised objective is based on a K-L divergence between (i) the model output generated by the machine learning model for the given unlabeled training input and (ii) the model output generated by the machine learning model for the augmented training input generated from the unlabeled training input.

15. The system of claim 13, wherein the model outputs are probability distributions and wherein the supervised objective is based on a negative log likelihood of the given ground truth output according to the probability distribution generated for the given labeled training input.

16. The system of claim 13, wherein the labeled and unlabeled training inputs in the augmented training data have been augmented by applying a different data augmentation technique from the data augmentation technique used to generate the augmented unlabeled training inputs.

17. The system of claim 13, wherein the model outputs are probability distributions, wherein the supervised objective is:
   based on a negative log likelihood of the given ground truth output according to the probability distribution generated for the given labeled training input when the probability assigned to the given ground truth output by the probability distribution is less than a confidence threshold, and equal to zero when the probability assigned to the given ground truth output by the probability distribution is equal to or greater than the confidence threshold.

18. The system of claim 17, wherein the training comprises:
   increasing the confidence threshold as training progresses.

19. The system of claim 18, wherein increasing the confidence threshold comprises increasing the confidence threshold after each training step.

20. The system of claim 13, wherein the machine learning model is trained to map model inputs comprising visual data to model outputs, thereby to perform a computer vision task.

* * * * *